(12) United States Patent
Donovan (10) Patent No.: US 7,010,103 B2
(45) Date of Patent: *Mar. 7, 2006

(54) METHODS FOR PROVIDING PREPAID TELEPHONY SERVICE VIA AN INTERNET PROTOCOL NETWORK SYSTEM

(75) Inventor: Steven R. Donovan, Plano, TX (US)

(73) Assignee: MCI, Inc., Ashburn, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/230,787

(22) Filed: Aug. 28, 2002

(65) Prior Publication Data

US 2003/0002640 A1 Jan. 2, 2003

Related U.S. Application Data

(63) Continuation of application No. 09/436,294, filed on Nov. 8, 1999.

(51) Int. Cl.
*H04M 15/00* (2006.01)

(52) U.S. Cl. ............................ 379/114.2; 379/114.17; 379/114.01

(58) Field of Classification Search .............. 379/114.2, 379/114.17, 114.01, 144.01, 111–115; 370/352, 370/401

See application file for complete search history.

(56) References Cited

U.S. PATENT DOCUMENTS

| | | | |
|---|---|---|---|
| 5,303,286 A | 4/1994 | Wiedeman | |
| 5,434,907 A | 7/1995 | Hurst et al. | |
| 5,634,012 A | 5/1997 | Stefik et al. | |
| 5,664,009 A | 9/1997 | Hurst et al. | |
| 5,680,116 A | 10/1997 | Hashimoto et al. | |
| 5,699,359 A | 12/1997 | Suga | |
| 5,732,219 A | 3/1998 | Blumer et al. | |
| 5,742,763 A | 4/1998 | Jones | |
| 5,745,556 A | 4/1998 | Ronen | |
| 5,794,039 A | 8/1998 | Guck | |
| 5,802,510 A | 9/1998 | Jones | |
| 5,826,039 A | 10/1998 | Jones | |
| 5,832,221 A | 11/1998 | Jones | |
| 5,859,898 A | 1/1999 | Checco | |
| 5,864,610 A | 1/1999 | Ronen | |
| 5,867,494 A | 2/1999 | Krishnaswamy et al. | |

(Continued)

FOREIGN PATENT DOCUMENTS

| EP | 0794650 | 9/1997 |
|---|---|---|
| WO | 97/16007 | 5/1997 |
| WO | 97/22210 | 6/1997 |
| WO | WO 97/22209 | 2/1999 |

OTHER PUBLICATIONS

Rosenberg et al., "Internet Telephony Gateway Location", 1998 IEEE, pp. 448–496.

(Continued)

*Primary Examiner*—Curtis Kuntz
*Assistant Examiner*—Barry W Taylor (57) ABSTRACT

Methods are disclosed for providing prepaid telephony service via an Internet protocol (IP) network system. A first method provides controlling at least one media agent or call routing station/switch of an IP network system for allowing and/or blocking call media streams from traversing through the media agent. A second method provides directing all signaling messages transmitted by a signaling agent or station and all media packets transmitting voice and data communications through at least one common device within the IP network system. The methods further provide for continuously monitoring a subscriber's account balance and terminating the prepaid telephony service if the account balance is less than a predetermined amount.

17 Claims, 8 Drawing Sheets

U.S. PATENT DOCUMENTS

| | | |
|---|---|---|
| 5,867,495 A | 2/1999 | Elliott et al. |
| 5,883,894 A | 3/1999 | Patel et al. |
| 5,889,774 A | 3/1999 | Mirashrafi et al. |
| 5,907,547 A | 5/1999 | Foladate et al. |
| 5,913,176 A | 6/1999 | Barabash |
| 5,923,659 A | 7/1999 | Curry et al. |
| 5,930,348 A | 7/1999 | Légnier et al. |
| 5,951,638 A | 9/1999 | Hoss et al. |
| 5,953,504 A | 9/1999 | Sokal et al. |
| 5,956,391 A | 9/1999 | Melen et al. |
| 5,958,005 A | 9/1999 | Thorne et al. |
| 5,960,416 A | 9/1999 | Block |
| 5,999,525 A | 12/1999 | Krishnaswamy et al. |
| 6,064,653 A | 5/2000 | Farris et al. |
| 6,067,442 A | 5/2000 | Wiedeman et al. |
| 6,069,890 A | 5/2000 | White et al. |
| 6,073,160 A | 6/2000 | Grantham et al. |
| 6,078,583 A | 6/2000 | Takahara et al. |
| 6,081,518 A | 6/2000 | Bowman-Amuah |
| 6,084,952 A | 7/2000 | Beerman, Jr. et al. |
| 6,094,525 A | 7/2000 | Perlman et al. |
| 6,118,864 A | 9/2000 | Chang et al. |
| 6,134,235 A | 10/2000 | Goldman et al. |
| 6,137,869 A * | 10/2000 | Voit et al. ............... 379/114.01 |
| 6,144,667 A | 11/2000 | Doshi et al. |
| 6,147,975 A | 11/2000 | Bowman-Amuah |
| 6,151,390 A | 11/2000 | Volftsun et al. |
| 6,151,629 A | 11/2000 | Trewitt |
| 6,157,648 A | 12/2000 | Voit et al. |
| 6,161,008 A | 12/2000 | Lee et al. |
| 6,163,536 A | 12/2000 | Dunn et al. |
| 6,167,042 A | 12/2000 | Garland et al. |
| 6,178,181 B1 | 1/2001 | Gritho |
| 6,188,760 B1 | 2/2001 | Oran et al. |
| 6,195,697 B1 | 2/2001 | Bowman-Amuah |
| 6,201,858 B1 | 3/2001 | Sundhar |
| 6,202,081 B1 | 3/2001 | Naudus |
| 6,215,858 B1 | 4/2001 | Bartholomew et al. |
| 6,226,289 B1 | 5/2001 | Williams et al. |
| 6,233,318 B1 | 5/2001 | Picard et al. |
| 6,240,391 B1 | 5/2001 | Ball et al. |
| 6,253,249 B1 | 6/2001 | Belzile |
| 6,278,707 B1 | 8/2001 | MacMillan |
| 6,282,270 B1 | 8/2001 | Porter |
| 6,292,479 B1 | 9/2001 | Bartholomew et al. |
| 6,301,609 B1 | 10/2001 | Aravamudan et al. |
| 6,333,931 B1 | 12/2001 | LaPier et al. |
| 6,335,927 B1 | 1/2002 | Elliott et al. |
| 6,335,968 B1 * | 1/2002 | Malik ...................... 379/114.2 |
| 6,339,594 B1 | 1/2002 | Civanlar et al. |
| 6,366,576 B1 | 4/2002 | Haga |
| 6,381,316 B1 * | 4/2002 | Joyce et al. ............. 379/114.2 |
| 6,411,705 B1 | 6/2002 | Oran et al. |
| 6,426,955 B1 | 7/2002 | Dalton et al. |
| 6,453,034 B1 * | 9/2002 | Donovan et al. ...... 379/220.01 |
| 6,463,053 B1 | 10/2002 | Chen |
| 6,507,647 B1 | 1/2003 | Mandalia |
| 6,515,997 B1 | 2/2003 | Feltner et al. |
| 6,519,242 B1 | 2/2003 | Emery et al. |
| 6,529,499 B1 | 3/2003 | Doshi et al. |
| 6,567,399 B1 | 5/2003 | Schuster et al. |
| 6,570,869 B1 | 5/2003 | Shankar et al. |
| 6,584,110 B1 | 6/2003 | Mizuta et al. |
| 6,658,022 B1 | 12/2003 | West et al. |

OTHER PUBLICATIONS

Schulzrinne, et al., "Signaling for Internet Telephony", IEEE, Sep. 1998, pp. 298–307.

Zimmerer, Eric, "SIP+ (Inter MGC Protocol); Edition 0.0", Level 3 Communications, Dec. 4, 1998, paragraph 0002, 02.1, 02.4 and Figure 4, <URL: www.cs.columbia.edu/sip/drafts/SIP+01.doc>.

Donovan, S., "The SIP Info Method", Internet Engineering Task Force, Feb. 8, 1999, the whole document.

Sijben, P. et al., "Toward the PSTN/Internet Inter-Networking; Media Device Control Protocol", Internet Engineering Task Force, Version .03, Feb. 9, 1999, paragraph 10.1 and 11.4.

Schulzrinne et al., "RTP Payload for DTMF Digits, Telephony Tones and Telephony Signals", Internet Engineering Task Force, Jun. 9, 1999, paragraph 0001, <URL: www.openphone.org/docs/dtmf/tones.pdf.>.

Schulzrinne, H. et al., "Signaling for Internet Telephony", IEEE, Oct. 13, 1998, pp. 298–307.

Rosenberg et al., "Programming Internet Telephony Services", IEEE Network, IEEE Inc., New York, US, vol. 13, No. 1, May 1999, pp. 42–49.

Lennox et al., "Transporting User Control Information in SIP Register Payloads", Internet Engineering Task Force, Feb.23, 1999, pp. 1–9.

\* cited by examiner

METHODS FOR PROVIDING PREPAID TELEPHONY SERVICE VIA AN INTERNET PROTOCOL NETWORK SYSTEM

CROSS-REFERENCE TO RELATED APPLICATIONS

This application is a continuation of the U.S. Patent Application having Ser. No. 09/436,294, filed Nov. 8, 1999.

BACKGROUND OF THE INVENTION

1. Field of the Invention

The present invention relates generally to telecommunications systems, and more specifically is directed toward methods of providing prepaid telephony service via an Internet protocol (IP) network system.

2. Description of the Related Art

Prepaid telephony service is a very popular service in the existing Public Switched Telephone Network (PSTN). For example, prepaid calling cards are typically used by PSTN subscribers to place calls. Typically, a user or subscriber of a prepaid calling card initiates a phone call by calling a signaling agent, such as a communications station or server, via a toll-free number (800/888) provided on the prepaid calling card. The subscriber is then prompted to enter his home telephone number and an identification number (PIN) also provided on the prepaid calling card using a telephone keypad.

The signaling agent then proceeds to perform validation procedures to determine if the home telephone number matches the identification number using a look-up table stored within a database or if the identification number is valid. If the two numbers match or if the identification number is valid, then the signaling agent performs database queries to determine if the subscriber's account balance is more than a predetermined amount. If the account balance is more than the predetermined amount, then the signaling agent informs the subscriber of the length of calling time available and indicates to the subscriber to enter a number to be dialed. The signaling agent then proceeds to place the call by transmitting signaling messages to appropriate communications devices along a media path flow, i.e., the path through which call media streams are routed through the PSTN. If the account balance is less than the predetermined amount, then the signaling agent informs the subscriber that a call cannot be placed.

During the duration of the call, the signaling agent monitors the subscriber's account balance. If the account balance falls below the predetermined amount, the signaling agent transmits a message to the subscriber via the same media path flow as the path of the call media streams indicating to the subscriber the amount of available time. After the subscriber's account balance has been depleted, the signaling agent tears down the PSTN call by blocking the media path flow as described below.

In the PSTN, the call is torn down by the signaling agent transmitting a "switch-off" signaling message to a media agent or a routing station along the media path flow through which the call media streams are routed through. The "switch-off" signaling message disables the media agent to prevent the call media streams from being transmitted further along the media path flow. Hence, the PSTN call is torn down.

It is inconsequential if the signaling agent is or is not located along the media path flow, since in the PSTN, signals transmitted to or received from any one station (e.g., a server) can be directed to or received from a variety of other stations or servers within the network. Therefore, in a prepaid calling card scenario, whether or not the signaling agent is located along the media path flow, the signaling agent can effectively control call setup, the duration of the call based on the subscriber's account balance, and call tear down by directing signaling messages to the appropriate media agent or other routing station.

Figure 1:
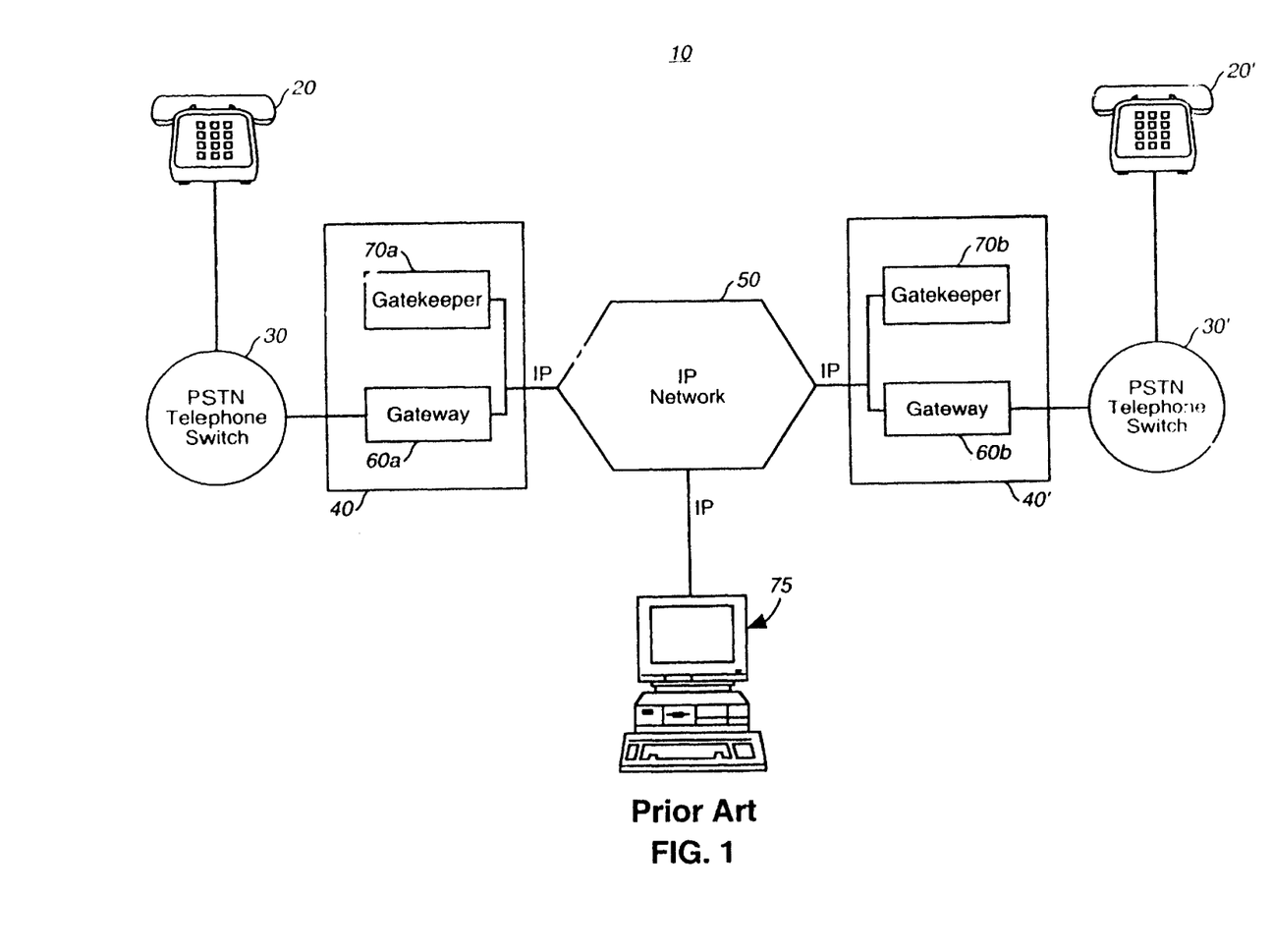
FIG. 1 is a block diagram of a prior art IP network system for placing a call via an IP network.

In the case of using an Internet protocol (IP) network system to place a non-prepaid call, with reference to FIG. 1, there is shown an IP network system designated generally by reference numeral 10 having a plurality of media agents, i.e., devices for handling packets through the system 10. In the IP network system 10, call media streams are routed from a telephone 20 through a PSTN telephone switch 30 to an IP telephony switch 40 over an ISDN line. The call media streams are then routed to the IP network 50 over an IP line, and then over a corresponding IP line to a destination IP telephony switch 40', further to a destination PSTN telephone switch 30' over an ISDN line and finally to a destination telephone 20'. The call media streams can also be routed from the telephone 20 to an IP terminal 75, such as a personal computer (PC).

The IP telephony switches 40 and 40' provide basic interfacing between the PSTN telephone switches 30 and 30' and IP network 50 and include both gateways 60a and 60b, as well as gatekeepers 70a and 70b. Gatekeepers 70a and 70b use the signaling information provided by the gateways 60a and 60b to provide directory services. During a call setup, the originating gatekeeper 70a sets up a communication path between the originating and terminating gateways 60a, 60b by determining the destination gatekeeper 70b associated with a destination IP address or telephone number. The destination gatekeeper 70b selects a destination gateway 60b to complete the IP virtual circuit.

Figure 2:
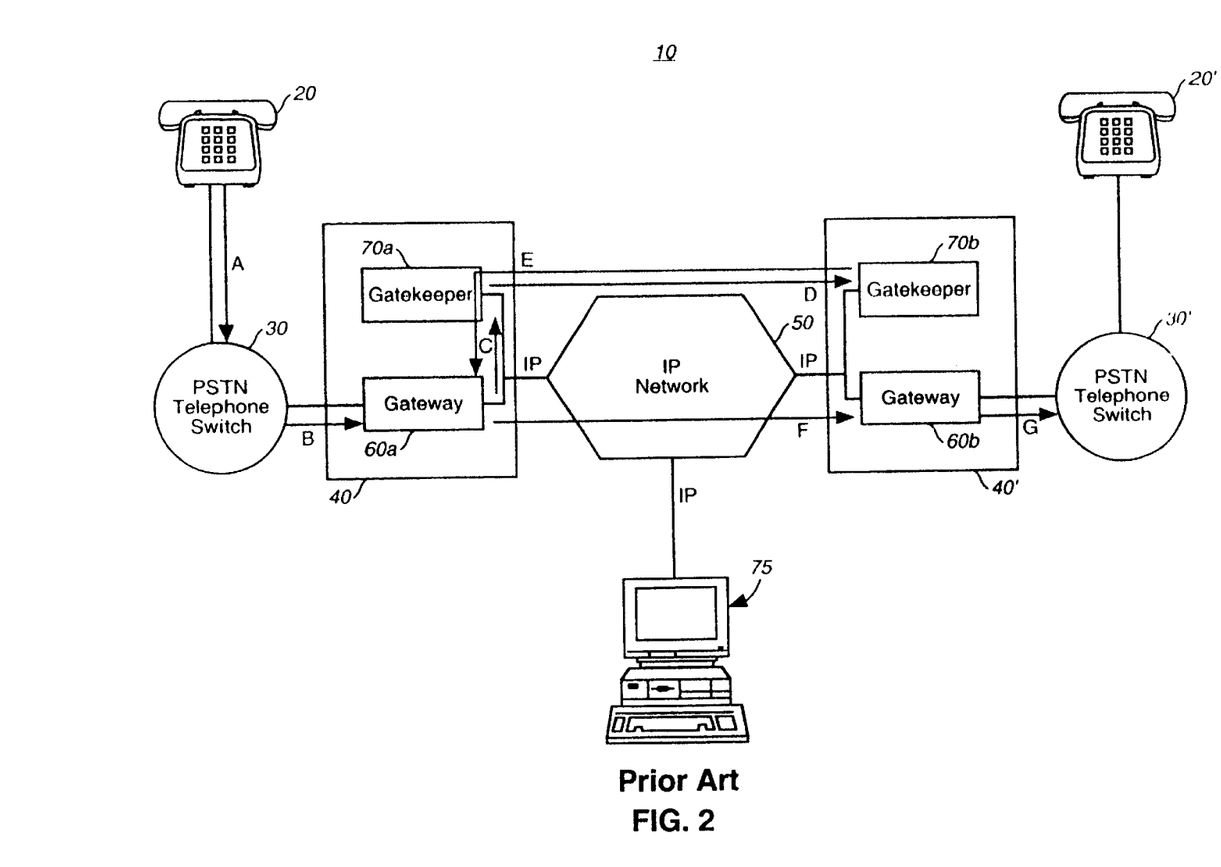
FIG. 2 is a prior art process flow block diagram for the IP network system of FIG. 1 indicating a sequence of events for placing a call via the IP network.

With reference to FIG. 2, an example of a call which originates in the PSTN, traverses the IP network, and terminates back in the PSTN is shown. First, at A, an Internet telephony service subscriber dials an access number provided by the Internet Telephony Service Provider. At B, the call is routed by the PSTN telephone switch 30 to the IP telephony switch 40. The gateway 60a at C plays an announcement requesting that the subscriber enter the destination telephone number to be called. The destination digit information is sent to the gatekeeper 70a. Accordingly, the gatekeeper 70a determines a destination gatekeeper IP address based on the destination digit information. An IP packet requesting the availability status of the destination gateway 60b is sent to the destination gatekeeper 70b at D. The destination gatekeeper 70b responds to the request by providing destination gateway 60b availability and IP address information. The originating gatekeeper 70a then transfers this information to the originating gateway 60a at E.

With continued reference to FIG. 2, at F, the originating gateway 60a sets up a virtual circuit to the destination gateway 60b. This circuit is identified by a call reference variable (CRV) that will be used by both gateways 60a, 60b for the duration of the call to identify all IP packets associated with this particular call. Finally, at G, the destination gateway 60b selects an outgoing PSTN voice trunk and signals to the PSTN switch 30 to attempt to set up a call to the dialed telephone number.

During the call, the packet-switched IP network 50 routes the IP packets associated with the particular call along different routes before reaching the IP telephony switch 40' or terminal 25 (e.g., a multimedia personal computer (PC) equipped with Session Initiation Protocol (SIP) or H.323 software, a microphone and speakers). SIP and H.323 terminals support the encoding/decoding and packetization/sequencing of information exchanged with other SIP and H.323 terminals or gateways. Packets are routed to the destination IP address contained within the header of each packet and may travel over separate network paths before arriving at their final destination for reassembly and resequencing. Accordingly, the routing of packets within the IP network is different than the routing of the call media streams by the PSTN during a conventional PSTN call, where all the call media streams associated with a particular call are routed along the same media path.

Accordingly, prepaid telephony services cannot be achieved via the IP network shown by FIGS. 1 and 2 and described above, since call signaling messages from a signaling agent, such as a server, do not take the same media path as the call media streams, since the IP network is a packet-based network where each packet from a particular station is routed along a different media path than other packets. Further, with conventional servers and IP network hardware, the call signaling messages cannot be directed or controlled to take the same path as the call media streams.

Therefore, a need exists for a method of having a signaling agent control at least one media agent of an IP network system for allowing and blocking call media streams from traversing through the media agent.

Further, a need exists for a method of directing all signaling messages transmitted by a signaling agent and all media packets transmitting voice and data communications through an IP network system through one media flow path.

SUMMARY OF THE INVENTION

The present invention provides methods for providing prepaid telephony service via an Internet protocol (IP) network system. A first method provides controlling at least one media agent or call routing station/switch of an IP network system for allowing and/or blocking call media streams from traversing through the media agent. A second method provides directing all signaling messages transmitted by a signaling agent or station and all media packets transmitting voice and data communications through at least one common device within the IP network system.

The first method of the present invention enables prepaid telephony service via an IP network system and includes the steps of providing a signaling station between a PSTN telephone switch and an IP telephony switch of the IP network system; forwarding a telephone number entered by a subscriber and received by the PSTN telephone switch to the signaling station; determining if the telephone number matches a prepaid access telephone number stored within a database; forwarding the telephone number to the IP telephony switch if the telephone number does not match the prepaid access telephone number to setup a non-prepaid call via an IP network; transmitting prepaid access instructions from the signaling station to the subscriber if the telephone number matches the prepaid access telephone number to inform the subscriber to continue placing a prepaid call by dialing at least a destination telephone number; forwarding the destination telephone number to the IP telephony switch via the PSTN telephone switch and signaling station; and setting up the prepaid call to the destination telephone number.

The method further includes the steps of during the prepaid call, continuously monitoring at the signaling station an account balance corresponding to the subscriber; transmitting from the signaling station to one of the PSTN telephone switch and the IP telephony switch a call interrupt signal if the account balance is less than a predetermined amount; receiving at one of the PSTN telephone switch and the IP telephony switch the call interrupt signal and terminating the prepaid call to the destination telephone number. It is contemplated that a message be transmitted to the subscriber indicating an amount of calling time available which corresponds to the account balance at least one time prior to the signaling station transmitting the call interrupt signal.

Further, it is contemplated that the steps of determining if the telephone number matches the prepaid access telephone number stored within the database of the signaling station, transmitting prepaid access instructions from the signaling station to the subscriber, and continuously monitoring at the signaling station the account balance corresponding to the subscriber be performed by the IP telephony switch by programming the IP telephony switch accordingly.

Additionally, the method further includes the step of periodically billing the subscriber if the prepaid call was charged to a telephone number corresponding to the subscriber.

The second method of the present invention enables prepaid telephony service via an IP network system and includes the steps of forwarding a telephone number entered by a subscriber and received by a PSTN telephone switch to an IP telephony switch; determining if the telephone number matches a prepaid access telephone number stored within a database; setting up a non-prepaid call via an IP network if the telephone number does not match the prepaid access telephone number; transmitting prepaid access instructions from the IP telephony switch to the subscriber if the telephone number matches the prepaid access telephone number to inform the subscriber to continue placing a prepaid call by dialing at least a destination telephone number; forwarding the destination telephone number to the IP telephony switch via the PSTN telephone switch; setting up the prepaid call to the destination telephone number by setting up a virtual media path flow circuit between the IP telephony switch, a relay station and one of a destination IP telephony switch and an IP terminal, where the relay station is located within the IP network; and during the prepaid call, directing signaling messages transmitted by the IP telephony switch, the destination IP telephony and the IP terminal, and packets corresponding to the prepaid call through the relay station.

The method further includes the steps of during the prepaid call, continuously monitoring, preferably, at the IP telephony switch or the destination IP telephony switch, an account balance corresponding to the subscriber; transmitting from the IP telephony switch, the destination IP telephony switch or the IP terminal to the relay station a call interrupt signal if the account balance is less than a predetermined amount; receiving at the relay station the call interrupt signal and terminating the prepaid call. It is contemplated that a message be transmitted to the subscriber indicating an amount of calling time available which corresponds to the account balance at least one time prior to transmitting the call interrupt signal to the relay station from the IP telephony switch, the destination IP telephony switch or the IP terminal. Further, it is contemplated that the step of continuously monitoring the account balance corresponding to the subscriber be performed by a signaling station connected to the IP telephony switch or the destination IP telephony switch by programming the signaling station accordingly.

Additionally, the method further includes the step of periodically billing the subscriber if the prepaid call was charged to a telephone number corresponding to the subscriber.

BRIEF DESCRIPTION OF THE DRAWINGS

Various preferred embodiments are described herein with references to the drawings.

DETAILED DESCRIPTION OF PREFERRED EMBODIMENTS

The present invention provides methods which enable prepaid telephony service between two subscribers of a Public Switched Telephone Network (PSTN), a subscriber of the PSTN and an IP multimedia terminal, or two IP multimedia terminals via an Internet protocol (IP) network. A first method provides controlling at least one media agent or call routing station/switch of an IP network system for allowing and/or blocking call media streams from traversing through the media agent. A second method provides directing all signaling messages transmitted by a signaling agent or station and all media packets transmitting voice and data communications through at least one common device within the IP network system.

Figure 3:
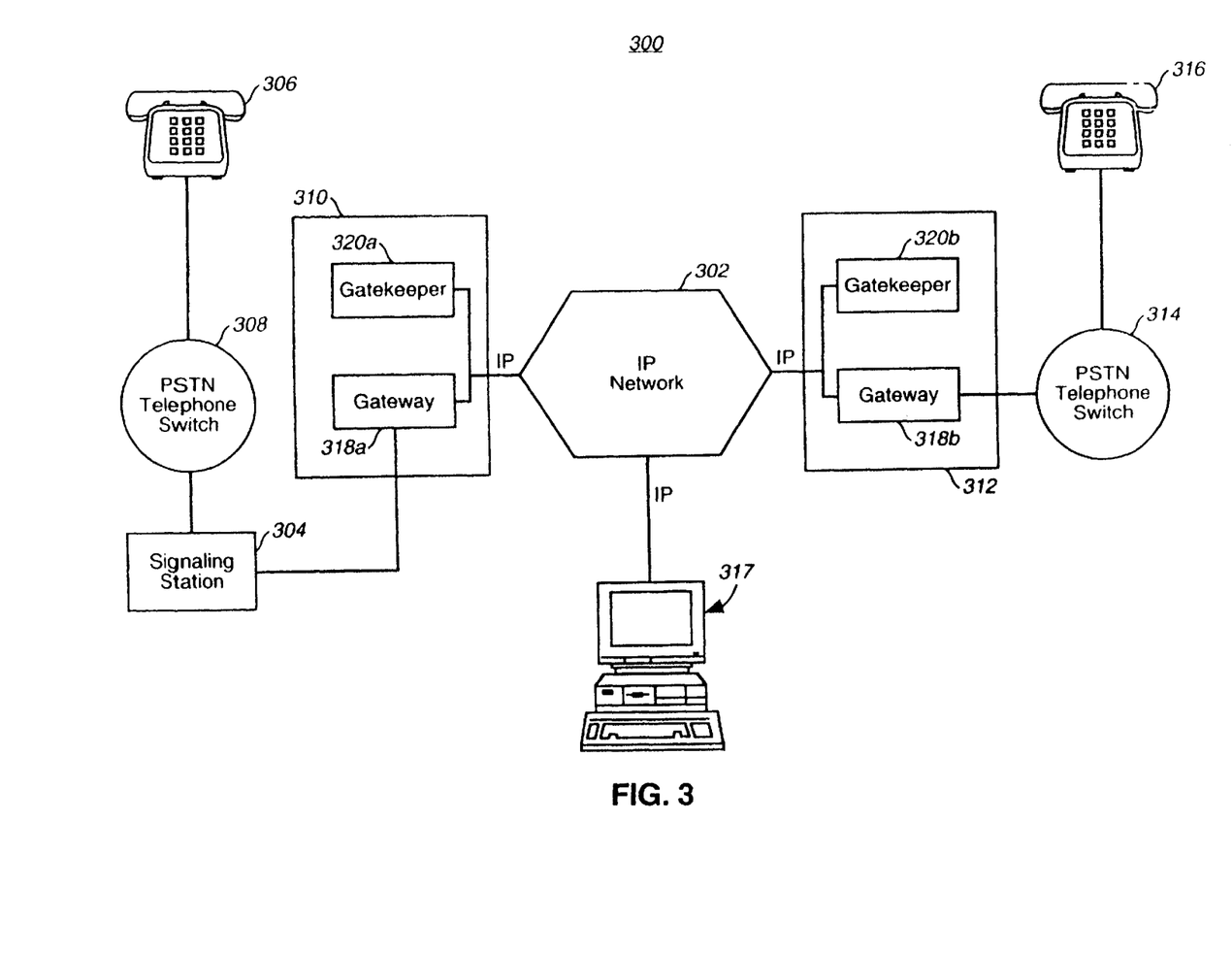
FIG. 3 is a block diagram of an IP network system in accordance with a first preferred method of the present invention for placing a prepaid call via the IP network.

Referring now in detail to the drawings, in which like reference numerals represent similar or identical elements throughout the several views, and with particular reference to FIG. 3, there is shown a block diagram of an IP network system designated generally by reference numeral 300 for placing a prepaid call via an IP network 302 in accordance with a first method of the present invention. The IP network system 300 includes a plurality of media agents, i.e., devices for handling packets through the system 300, including a signaling station 304. In the IP network system 300, call media streams are routed from a telephone 306 to a PSTN telephone switch 308 to the signaling station 304 over an ISDN line to an IP telephony switch 310 over an IP line to the IP network 302 over an IP line. The call media streams are then routed to a destination IP telephony switch 312 over an IP line to a destination PSTN telephone switch 314 over an ISDN line, and finally to a destination telephone 316. The call media streams can also be routed to an IP terminal 317, such as a PC.

The IP telephony switches 310, 312 provide basic interfacing between the PSTN telephone switches 308, 314 and IP network 302 and include both gateways 318 and gatekeepers 320. It is apparent to persons skilled in the art that signaling proxy servers, especially Session Initiation Protocol (SIP) proxy servers, could be used instead of gatekeepers 320. Gatekeepers 320 use the signaling information provided by the gateways 318 to provide directory services. During a call setup, the originating gatekeeper 320a sets up a communication path between the originating and terminating gateways 318a, 318b by determining the destination gatekeeper 320b associated with a destination IP address or telephone number. The destination gatekeeper 320b selects a destination gateway 318b to complete the IP virtual circuit.

Figure 4A:
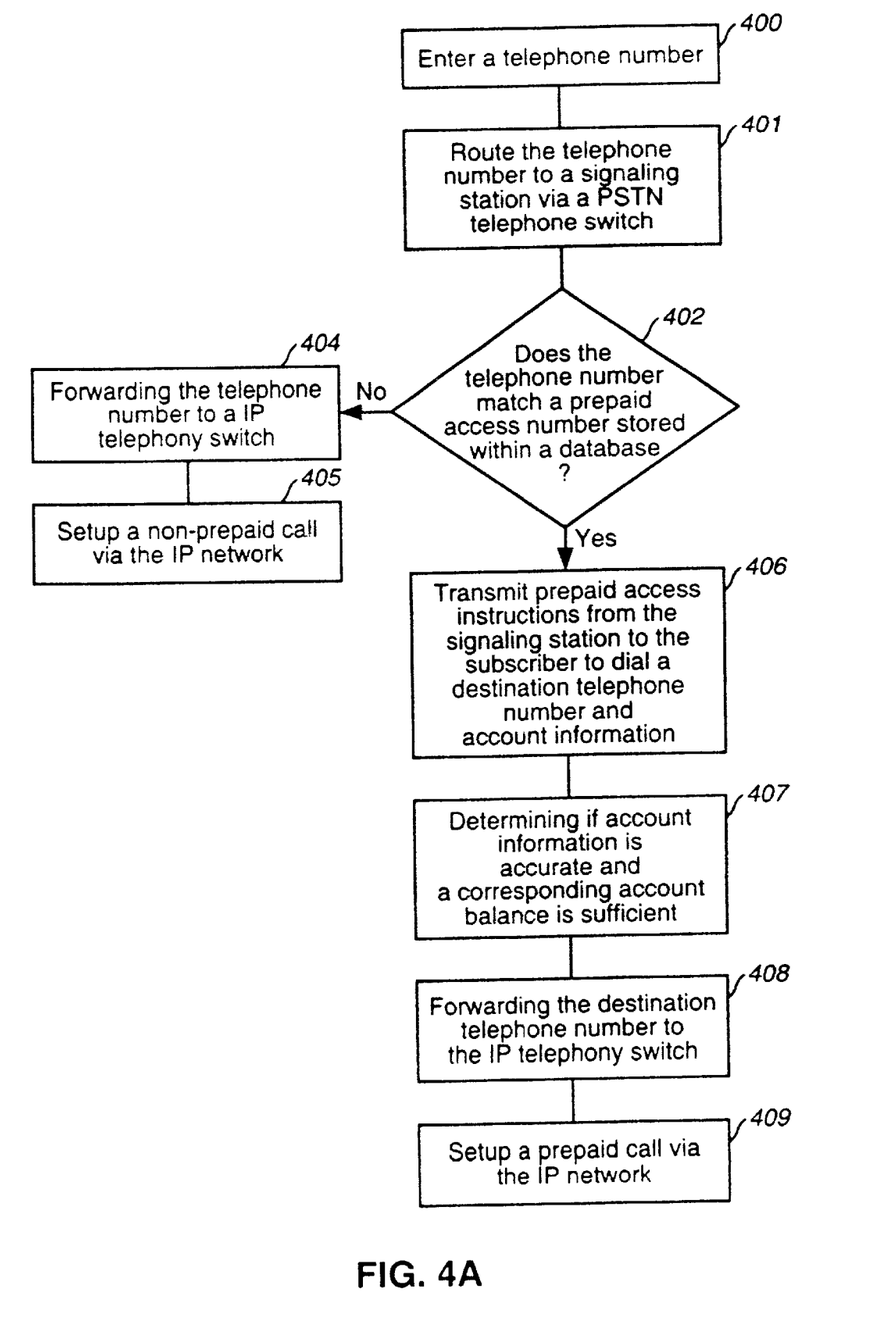
FIG. 4A is a flow chart for placing either a non-prepaid or a prepaid call via the IP network according to the first preferred method.
Figure 4B:
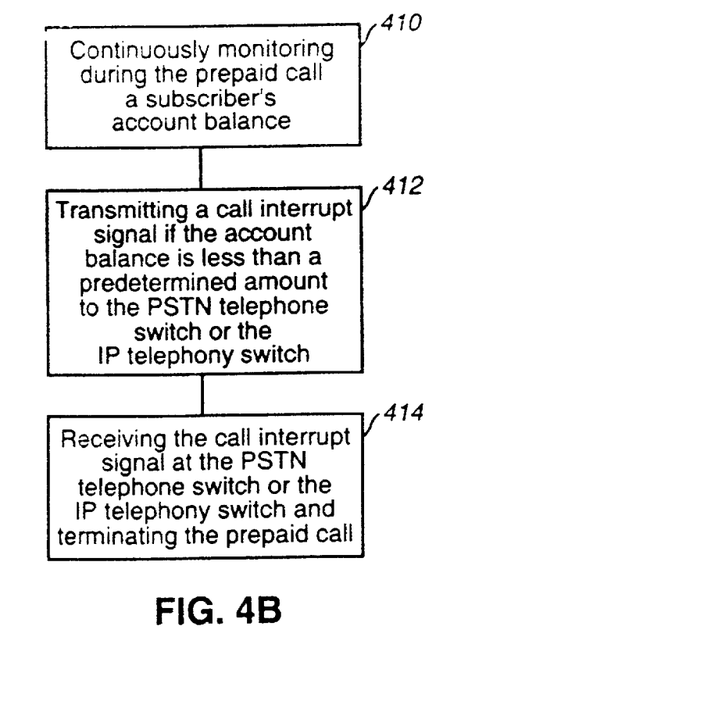
FIG. 4B is a flow chart for continuously monitoring an account balance corresponding to the subscriber during the prepaid call.
Figure 4C:
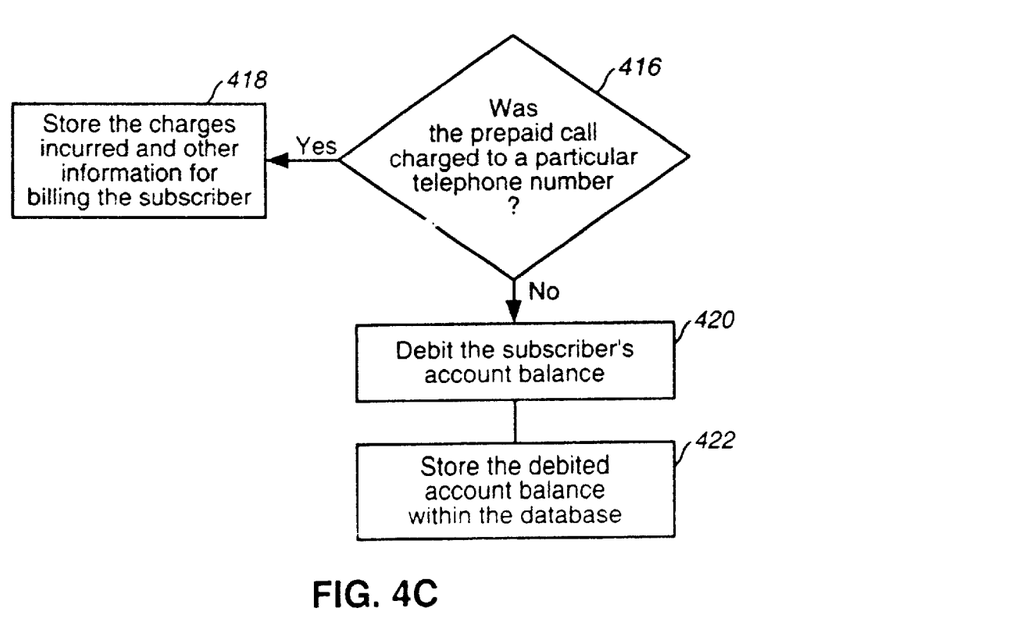
FIG. 4C is a flow chart for performing billing functions for billing the subscriber after termination of the prepaid call.

FIGS. 4A–C depict flow charts for placing the prepaid call via the IP network according to the first preferred method. With reference to FIG. 4A, a call is setup by entering a telephone number at step 400. The telephone number is then received by the PSTN telephone switch 308 and is routed to the signaling station 304 at step 401. The signaling station 304 at step 402 determines if the telephone number matches a prepaid access telephone number stored within a database. The database is preferably stored within the signaling station 304 or a remote station connected to the signaling station 304. If the telephone number does not match the prepaid access telephone number, the telephone number is forwarded to the IP telephony switch 310 at step 404 to setup a non-prepaid call via the IP network 302 at step 405, as described above with respect to placing a call using the originating and destination gateways 318a, 318b and the originating and destination gatekeepers 320a, 320b.

If the telephone number matches the prepaid access telephone number at step 402, prepaid access instructions are transmitted from the signaling station 304 to the subscriber at step 406 to inform the subscriber to place a prepaid call by dialing at least a destination telephone number. Additional information to be dialed includes the subscriber's account number and account personal identification number (PIN). If the account information is determined to be accurate and a subscriber's account balance is sufficient (i.e., greater than a predetermined amount) as determined at step 407 by the signaling station 304, the destination telephone number is then forwarded at step 408 to the IP telephony switch 310 via the PSTN telephone switch 308 and signaling station 304. The prepaid call is then setup at step 409. If the account information is not accurate or the subscriber's account balance is not sufficient, then the call is terminated.

With reference to FIG. 4B, the method further includes continuously monitoring during the prepaid call the account balance corresponding to the subscriber at step 410. Preferably, step 410 is performed at the signaling station 304. If the account balance is less than a predetermined amount, a call interrupt signal is transmitted from the signaling station 304 to either the PSTN telephone switch 308 or the IP telephony switch 310 at step 412. It is also contemplated that the call interrupt signal is transmitted from the signaling station 304 to the PSTN telephone switch 314 or the IP telephony switch 312 at the destination side, or to the IP terminal 317 in the case of telephony service between a PSTN subscriber and the IP terminal 317.

The call interrupt signal is then received by the PSTN telephone switch 308 or the IP telephony switch 310 and the prepaid call to the destination telephone number is terminated at step 414. It is contemplated that a message be transmitted to the subscriber from the signaling station 304, which indicates an amount of calling time available according to the account balance, at least one time before the call interrupt signal is transmitted by the signaling station 304.

Further, it is contemplated that the steps of determining if the telephone number matches the prepaid access telephone number stored within the database of the signaling station, transmitting calling card access instructions from the signaling station 304 to the subscriber, determining if the account information is accurate and that the subscriber's account balance is sufficient, and continuously monitoring at the signaling station 304 the account balance corresponding to the subscriber be performed by the IP telephony switch 310 by programming the IP telephony switch 310 accordingly to perform these steps.

Additionally, with reference to FIG. 4C, the method of the present invention further includes determining at the signaling station 304 whether the prepaid call was charged to a particular telephone number at step 416. If the prepaid call was charged to a particular telephone number, then the signaling station 304 at step 418 stores the charges incurred and other information, such as a length of time of the prepaid call and the destination telephone number, for billing the subscriber at a later time.

If the prepaid call was not charged to a particular telephone number, e.g., the prepaid call was a prepaid calling card call, then the signaling station 304 at step 420 debits the subscriber's account balance and at step 422 stores the debited account balance in the database.

It is contemplated that the billing steps of 416, 418, 420 and 422 be performed by the IP telephony switch 310 by programming the IP telephony switch 310 accordingly. Hence, it is further contemplated that the IP telephony switch 310 transmits the billing information to a plurality of other IP telephony switches connected to the IP network. Therefore, if a different IP telephony switch is used to initiate a prepaid call in the future via the IP network 302, it contains the subscriber's billing information, including the subscriber's account balance.

Figure 5:
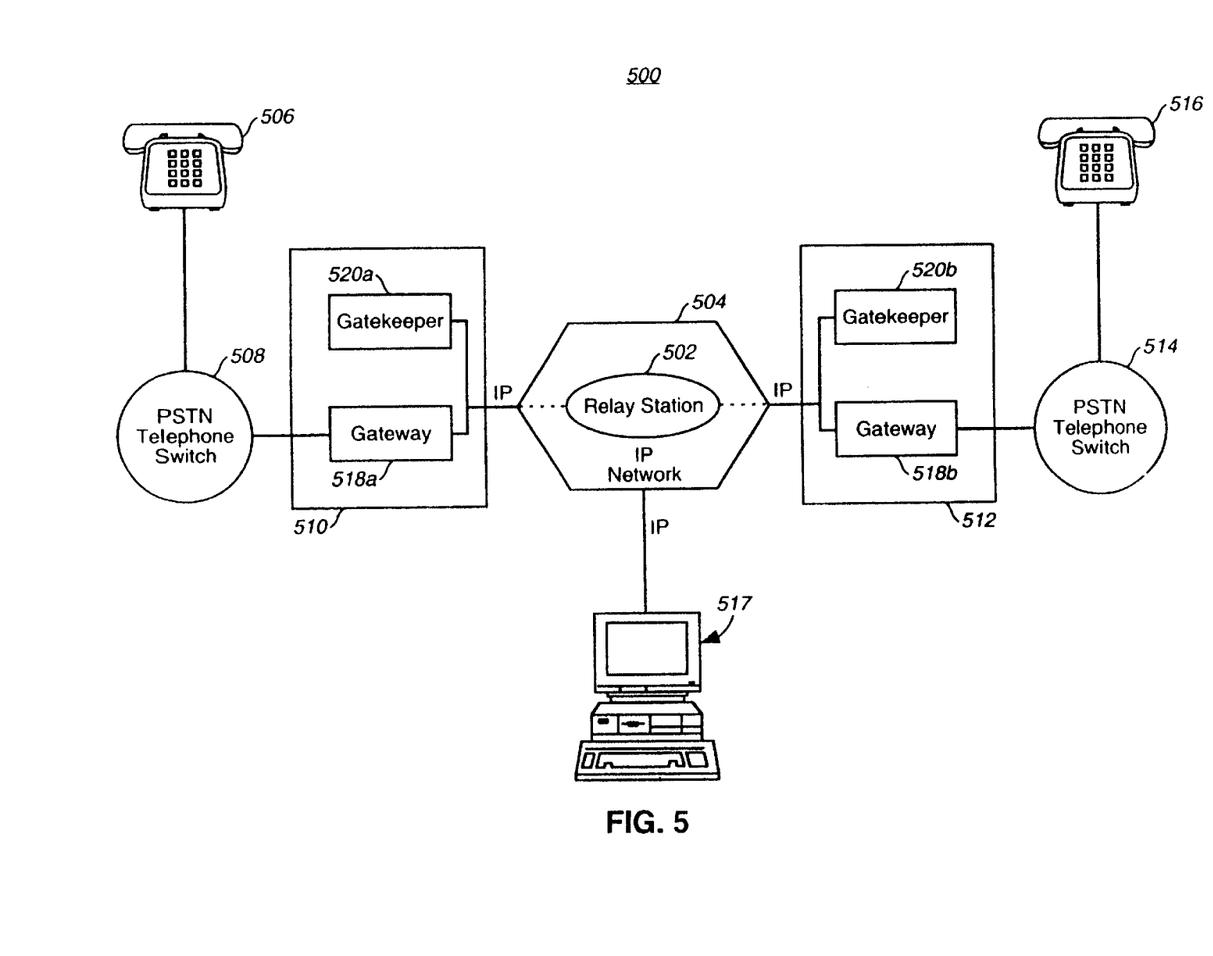
FIG. 5 is a block diagram of an IP network system in accordance with a second preferred method of the present invention for placing a prepaid call via the IP network.

With reference to FIG. 5, there is shown a block diagram of an IP network system designated generally by reference numeral 500 for placing a prepaid call via an IP network in accordance with a second method of the present invention. The IP network system 500 includes a plurality of media agents including a relay station 502 within an IP network 504. In the IP network system 500, call media streams are routed from a telephone 506 to a PSTN telephone switch 508 to an IP telephony switch 510 and to the IP network 504. The call media streams are then routed over an IP line from the relay station 502 within the IP network 504 to a destination IP telephony switch 512 over an IP line and then to a destination PSTN telephone switch 514 over an ISDN line, and finally to a destination telephone 516. The call media streams can also be routed to an IP terminal 517.

As described above for the IP network system 300 shown in FIG. 3, the IP telephony switches 510, 512 provide basic interfacing between the PSTN telephone switches 508, 514 and IP network 504 and include both gateways 518 and gatekeepers 520 which operate as described above.

Figure 6A:
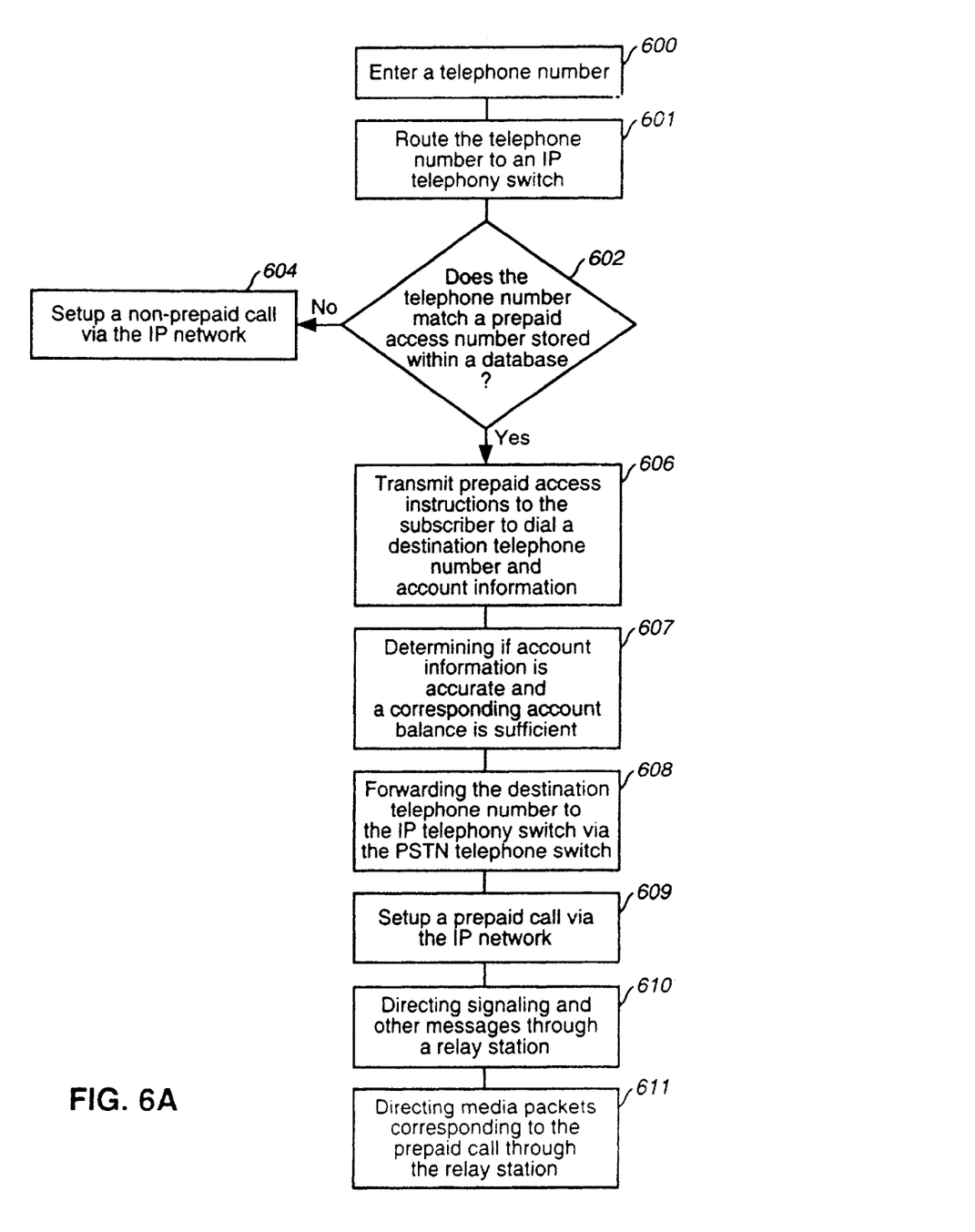
FIG. 6A is a flow chart for placing either a non-prepaid or a prepaid call via the IP network according to the second preferred method.
Figure 6B:
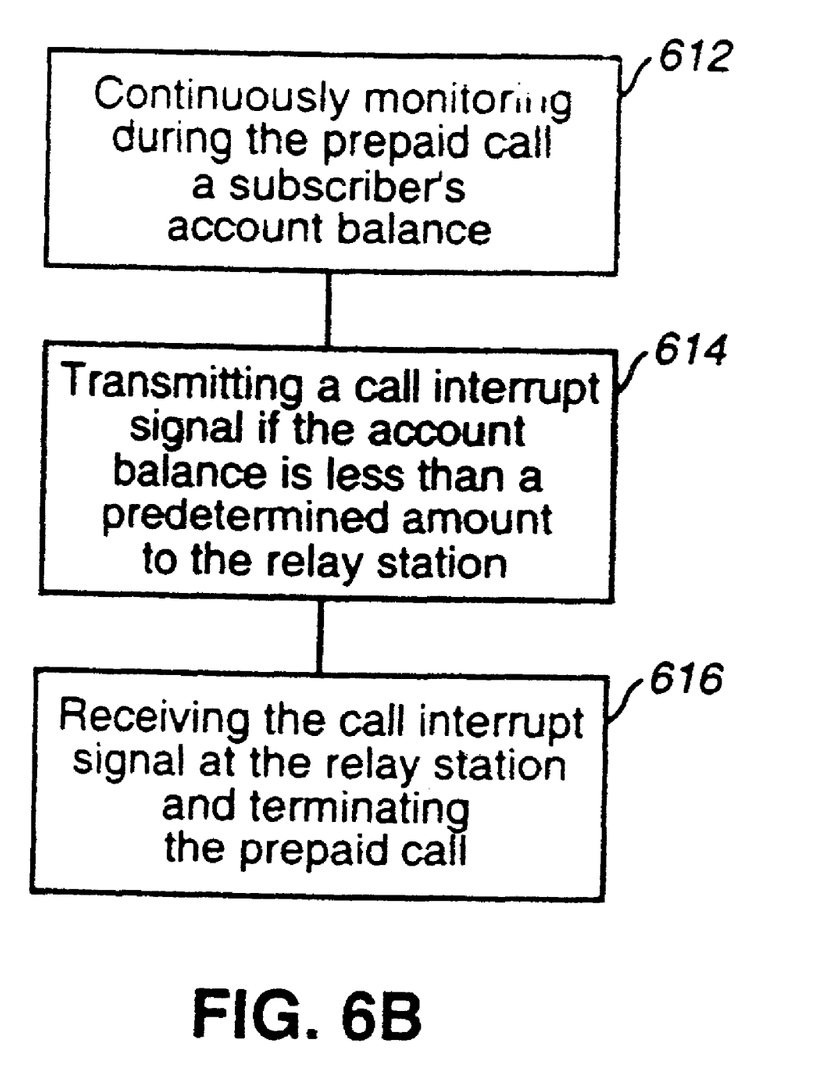
FIG. 6B is a flow chart for continuously monitoring an account balance corresponding to the subscriber during the prepaid call.

FIGS. 6A–B depict flow charts for placing the prepaid call via the IP network according to the second preferred method. With reference to FIG. 6A, a call is setup by entering a telephone number at step 600. The telephone number is then received by the PSTN telephone switch 508 and is routed to the IP telephony switch 510 at step 601. The IP telephony switch 510 at step 602 determines if the telephone number matches a prepaid access telephone number stored within a database. The database is preferably stored within the IP telephony switch 510 or a remote station connected to the IP telephony switch 510. If the telephone number does not match the prepaid access telephone number, the IP telephony switch 510 at step 604 set ups a non-prepaid call via the IP network 504, as described above with respect to FIG. 3, by placing a call using the originating and destination gateways 518a, 518b and the originating and destination gatekeepers 520a, 520b.

If the telephone number matches the prepaid access telephone number at step 602, prepaid access instructions are transmitted to the subscriber at step 606 to inform the subscriber to place a prepaid call by dialing at least a destination telephone number. Additional information to be dialed includes the subscriber's account number and account personal identification number (PIN). If the account information is determined to be accurate and a subscriber's account balance is sufficient (i.e., greater than a predetermined amount) as determined at step 607, the destination telephone number is then forwarded at step 608 to the IP telephony switch 510 via the PSTN telephone switch 508. The prepaid call is then setup at step 609 by setting up a virtual media path flow circuit between the IP telephony switch 510, the relay station 502 and the destination IP telephony switch 512 or the IP terminal 517. If the account information is not accurate or the subscriber's account balance is not sufficient, then the call is terminated.

During the prepaid call, signaling and other messages transmitted by the IP telephony switch 510 are directed through the relay station 502 as indicated by step 610. Further, all media packets corresponding to the prepaid call are also directed through the relay station 502 as indicated by step 611.

The signaling messages and media packets are directed through the relay station 502, by providing the IP address of the relay station 502 within a header of each message and media packet transmitted from the IP telephony switch 510 and IP telephony switch 512, as well as the IP address of the IP telephony switch 512. Therefore, even though the packets travel over separate network paths within the IP network 504 before arriving at the IP telephony switch 512, the IP telephony switch 510 or the IP terminal 517 for reassembly and resequencing, each packet passes through the relay station 502 of the virtual media path flow circuit.

With reference to FIG. 6B, the method further includes continuously monitoring during the prepaid call the account balance corresponding to the subscriber at step 612. Preferably, step 612 is performed at the IP telephony switch 510 or a remote station connected to the IP telephony switch 510. If the account balance is less than a predetermined amount, a call interrupt signal in the form of a packet is transmitted from the IP telephony switch 510 to the relay station 502 at step 614. It is contemplated that the call interrupt packet can also be transmitted from the IP telephony switch 512 or the IP terminal 517. The call interrupt packet includes within a header the IP address of the relay station 502. The call interrupt signal is then received by the relay station 502 and the prepaid call to the destination telephone number is then terminated at step 616. The prepaid call is terminated by the relay station blocking signaling and media packets from passing therethrough and reaching the IP telephony switch 512 or the IP terminal 517.

It is contemplated that a message be transmitted to the subscriber indicating an amount of calling time available which corresponds to the account balance at least one time prior to transmitting the call interrupt signal to the relay station 502. Further, it is contemplated that the step of continuously monitoring the account balance corresponding to the subscriber be performed by a signaling station connected to the IP telephony switch 510 by programming the signaling station accordingly.

Additionally, the method of the present invention further includes determining whether the prepaid call was charged to a particular telephone number. If the prepaid call was charged to a particular telephone number, then the charges incurred and other information, such as a length of time of the prepaid call and the destination telephone number, are stored for billing the subscriber at a later time. These steps are preferably performed by the IP telephony switch 510 or a remote station connected to the IP telephony switch 510 and are identical to steps 416 and 418 of FIG. 4C.

If the prepaid call was not charged to a particular telephone number, e.g., the prepaid call was a prepaid calling card call, then the subscriber's account balance is debited and the debited account balance is stored within the database. These steps are preferably performed by the IP telephony switch 510 or a remote station connected to the IP telephony switch 510 and are identical to steps 420 and 422 of FIG. 4C.

What has been described herein is merely illustrative of the application of the principles of the present invention. For example, the functions described above and implemented as the best mode for operating the present invention are for illustration purposes only. Other arrangements and methods may be implemented by those skilled in the art without departing from the scope and spirit of this invention.

What is claimed is:

1. A method for providing prepaid telephony service via an IP network system, comprising:

receiving, via a PSTN telephone switch, a telephone number entered by a subscriber;

determining if the telephone number matches a prepaid access telephone number;

transmitting prepaid access instructions to the subscriber if the telephone number matches the prepaid access telephone number;

determining if the account information is accurate and a corresponding account balance is greater than a predetermined amount;

forwarding the telephone number to the originating IP telephony switch via an originating PSTN telephone switch if the account information is accurate and the corresponding account balance is greater than the predetermined amount; and setting up the prepaid call to the telephone number.

2. The method of claim 1, further comprising:

continuously monitoring, during the prepaid call, an account balance corresponding to the subscriber, and transmitting to one of the originating PSTN telephone switch and the originating IP telephony switch a call interrupt signal if the account balance is less than the predetermined amount.

3. The method of claim 1, further comprising the step of transmitting a message to the subscriber indicating an amount of calling time available which corresponds to the account balance at least one time prior to transmitting the call interrupt signal.

4. The method of claim 1, further comprising the step of forwarding the telephone number to the originating IP telephony switch if the telephone number does not match the prepaid access telephone number to setup a non-prepaid call via the IP network.

5. The method of claim 1, wherein the prepaid access telephone number is stored within a database.

6. A system for providing prepaid telephony service via an IP network system comprising:

means for receiving, via a PSTN telephone switch, a telephone number entered by a subscriber;

means for determining if the telephone number matches a prepaid access telephone number;

means for transmitting prepaid access instructions to the subscriber if the telephone number matches the prepaid access telephone number;

means for determining if the account information is accurate and a corresponding account balance is greater than a predetermined amount;

means for forwarding the telephone number to the originating IP telephony switch via an originating PSTN telephone switch if the account information is accurate and the corresponding account balance is greater than the predetermined amount; and means for setting up the prepaid call to the telephone number.

7. The system of claim 6, further comprising:

continuously monitoring, during the prepaid call, an account balance corresponding to the subscriber; and transmitting to one of the originating PSTN telephone switch and the originating IP telephony switch a call interrupt signal if the account balance is less than the predetermined amount.

8. The system of claim 6, further comprising the step of transmitting a message to the subscriber indicating an amount of calling time available which corresponds to the account balance at least one time prior to transmitting the call interrupt signal.

9. The system of claim 6, further comprising the step of forwarding the telephone number to the originating IP telephony switch if the telephone number does not match the prepaid access telephone number to setup a non-prepaid call via the IP network.

10. The system of claim 6, wherein the prepaid access telephone number is stored within a database.

11. A method for providing prepaid telephony service via an IP network system, comprising:

receiving a telephone number dialed by a subscriber;

determining if the telephone number matches a prepaid access telephone number stored within an originating IP telephony switch;

transmitting prepaid access instructions to the subscriber if the telephone number matches the prepaid access telephone number to continue placing a prepaid call by dialing at least a destination telephone number and account information;

receiving via a PSTN telephone switch, the destination telephone number at the originating IP telephony switch, wherein the account information is determined to be accurate and the corresponding account balance is determined to be greater than the predetermined amount; and setting up the prepaid call to the destination telephone number via the IP network.

12. The method of claim 11, further comprising determining if the account information is accurate and a corresponding account balance is greater than a predetermined amount.

13. The method of claim 12, further comprising:

continuously monitoring, during the prepaid call, at the originating IP telephony switch the account balance corresponding to the subscriber; and terminating the prepaid call to the destination telephone number if the account balance is less than the predetermined amount.

14. The method of claim 13, further comprising transmitting a message to the subscriber indicating an amount of calling time available which corresponds to the account balance at least one time prior to terminating the prepaid call.

15. The method of claim 13, further comprising:

debiting the account balance;

storing the debited account balance within the originating IP telephony switch; and transmitting the debited account balance from the originating IP telephony switch to a plurality of IP telephony switches connected to the IP network.

16. The method of claim 11, further comprising:

determining if the prepaid call was charged to a telephone number corresponding to the subscriber;

storing information relating to the prepaid call including a length of time of the prepaid call and the destination telephone number if the prepaid call was charged to the telephone number corresponding to the subscriber; and periodically billing the subscriber according to the stored information.

17. The method according to claim 11, further comprising the step of setting up a non-prepaid call via the IP network, the destination IP telephony switch and the destination PSTN telephone switch if the telephone number does not match the prepaid access telephone number.

* * * * *